(No Model.)
J. H. DUNCAN.
VACUUM PAN.
No. 499,721. Patented June 20, 1893.
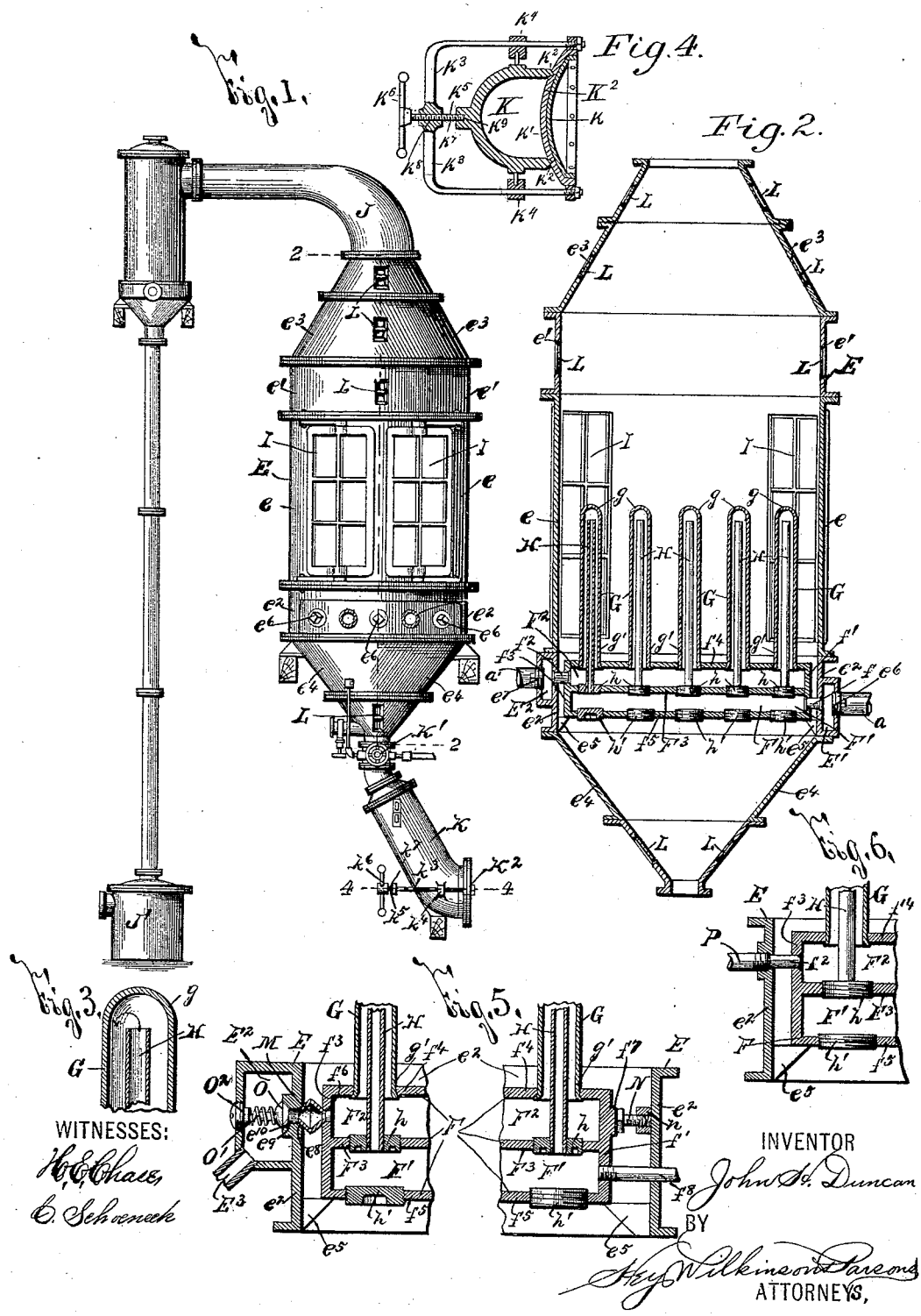

UNITED STATES PATENT OFFICE.

JOHN H. DUNCAN, OF SYRACUSE, NEW YORK.

VACUUM-PAN.

SPECIFICATION forming part of Letters Patent No. 499,721, dated June 20, 1893.

Application filed May 31, 1892. Serial No. 434,931. (No model.)

*To all whom it may concern:*

Be it known that I, JOHN H. DUNCAN, of Syracuse, in the county of Onondaga, in the State of New York, have invented new and useful Improvements in Vacuum-Pans, of which the following, taken in connection with the accompanying drawings, is a full, clear, and exact description.

My invention relates to improvements in vacuum pans, and has for its object the production of a simple, practical, and efficient device particularly applicable for evaporating brine in the manufacture of salt; and to this end it consists, essentially, in a vacuum pan, a substantially horizontal head within the pan formed with inlet and outlet chambers arranged one above the other and separated by a substantially horizontal partition, a series of heating tubes extending upwardly from the head having their upper ends closed and their lower ends opening from the outlet chamber of the head, a series of pipes extending upwardly from the inlet chamber of the head having their upper ends discharging within said tubes and their lower ends opening from said inlet chamber and in connections for securing said heads in position, and for conveying the heating fluid to and from the heating tubes.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is an enlarged elevation of one of the detached vacuum pans of my invention. Fig. 2 is a vertical sectional view, taken on line —2—2—, Fig. 1. Fig. 3 is a vertical sectional view of the detached upper end of one of the heating tubes and the pipe discharging thereinto. Fig. 4 is a horizontal sectional view, taken on line —4—4—, Fig. 1, representing the lower end of the receiving chamber connected to the vacuum pan and the valve for the lower end of said chamber. Fig. 5 is a vertical sectional view partly broken away of a slightly modified form of a section of a vacuum pan and a horizontal heating head and its heating tubes, and Fig. 6 is a similar vertical sectional view of a further modified form of my invention.

My vacuum pans —E—E— are preferably formed of a central section —e—, upper and lower sections —$e'$—$e^2$—, and upper and lower conical sections —$e^3$—$e^4$— above and below the sections —$e'$—$e^2$—. Within the pans —E—E—, as best seen at Fig. 2, are closed heating heads —F— preferably disposed in substantially horizontal planes and mounted upon shoulders —$e^5$— projecting from the inner periphery of the lower edge of the section —$e^2$—. The central head —F— is shown in section at Fig. 2, and it is there clearly illustrated that the same is provided with inlet and outlet chambers —F'— F²— arranged one above the other and separated by an intervening partition —F³—.

—f— represents a short pipe having one end expanded into the end wall —$f'$— of the head —F— and the other into the adjacent wall of the section —$e^2$— for connecting the inlet chamber —F'— of the head —F— with a chamber —E'— in the wall of the vacuum pan into which discharge the heating pipes —a—. The outer wall of this chamber —E'— is provided with a removable plug —$e^6$— arranged opposite to the pipe or tube —f— for permitting access thereto.

—$f^2$— is an outlet pipe or tube corresponding to the pipe —f— having one end expanded into the wall —$f^3$— of the head —F— and the other into the adjacent portion of the wall of the section —$e^2$— for conducting the heating fluid from the outlet chamber —F²— of the head —F— to a chamber —E²— in the wall of the vacuum pan connected to the discharge pipes —$a'$—. The wall of this chamber —E²— is also provided with a plug —$e^7$— aligned with the pipes or tubes —$f^2$—.

I preferably use a number of heads —F— and a similar number of inlet pipes —f— and outlet pipes —$f^2$— and the chambers —E'—E²— are formed with a corresponding number of plugs —$e^6$—$e^7$—.

—G— is a heating tube opening outwardly or upwardly from the head —F— and formed with one end —g— closed and the other —$g'$— expanded into the top wall —$f^4$— of the head —F—.

—H— is a pipe having its lower end secured to a plug —h— removably mounted in the partition —F³— and its other end extended upwardly in close proximity to the corresponding end of the tube —G—, as best seen at Figs. 2 and 3.

—h'— is a plug removably mounted in the bottom wall —f⁵— of the head —F— directly beneath the plug —h— for permitting removal of the plug —h— and pipe —H— and the entrance of an expanding tool for securing the tube —G— in position.

I have here shown a series of tubes —G— and pipes —H—, and it will be understood that the number thereof is immaterial, and that each of the other heads —F— is provided with corresponding tubes —G— and pipes —H—. In operation the heating fluid, discharged within the inlet chamber —F'—, passes upwardly through the pipes —H— to the upper end of the tubes —G—, and thence downwardly through said tubes into the outlet chamber —F²— and into the chamber —E²— and pipe or flue —C³—, as previously described.

—I—I—I—I— are doors arranged in pairs on opposite sides of the vacuum pan for normally closed openings in the wall of the vacuum pan for permitting entrance of the heads —F—, and, as preferably constructed, these doors are sufficiently high so that the tubes —G— and pipes —H— may be first secured in position as described, and the complete head and its tubes passed through said doors and then dropped into engagement with the shoulders —e⁵—e⁵—. The pipes —f—f²— are then secured in position, and the plugs —e⁶—e⁷— forced to their operative position, whereupon the vacuum pan is in condition for operation.

Should one of the heating tubes —G— leak at its lower end —g'— the head to which said pipe is secured is readily removed through the doors —I—I— by withdrawing the plugs —e⁶—e⁶— registered with the pipes —f²—f²— secured to said head and by then cutting through said thin pipes —f²—f². The plugs —h'—h— and the pipe —H— are then readily removed, and the tube —G— again expanded in position or replaced by a new one. This particular construction of vacuum pan is particularly practical, as the heating heads and their heating tubes are operatively secured together before insertion into the vacuum pan, and the heating tubes —G— and pipes —H— are so constructed and arranged that the hottest portion of the heating tubes is upward, so that the upper portion of the liquid within the vacuum pan is heated to the greatest extent. This is a very practical action, and is much more efficient than when the hottest portion of the heating tubes is at its base instead of its top. Moreover, as the heating tubes are vertical, the liability of scale forming thereupon is reduced to a minimum, and consequently the action of the vacuum pan is more efficient, and its durability greatly increased.

To accelerate the evaporation of the brine or other liquid within the vacuum pan I connect a pipe —J— to the conical section —e³— and to said pipe connect a suitable condenser or pump —J'—. Connected to the lower section —e⁴— of the vacuum pan is a receiving chamber —K— having an upper valve —K'— and a lower valve —K²—. The valve —K'— permits the salt or other substance evaporated from the brine or other liquid within the vacuum pan, to feed into the chamber —K— and the lower valve —K²— permits the withdrawal of the salt or other substance from the chamber —K—. The valve —K²— is preferably formed of a plate —k— having a yielding convex face —k'— adapted to impinge against a sharp edge —k²— surrounding the outlet opening of the chamber —K—. The plate —k— is carried in a U-shaped bracket —k³—, which passes through guides —k⁴— projecting from opposite walls of the lower end of the chamber —K—, and is reciprocated by a screw —k⁵— or other clamping device. The screw —k⁵— is, as best seen at Fig. 5, formed with a hand engaging face —k⁶— and with a screw threaded shank —k⁷— passed through an opening —k⁸— in the yoke —k³—. The opposite or outer end of the screw shank —k⁷— bears against a suitable shoulder —k⁹— on the outlet chamber —K—, and, as the screw —k⁵— is revolved, the yoke is drawn backward or forward, and the yielding face —k'— of the valve —K²— drawn toward or away from the edge —k²—. The threads on the screw —k⁵— are of great pitch in order that the movement of the valve plate —k— may be rapid, and by this impingement of a yielding plate upon a sharp edge I form an absolutely tight joint, which is very essential in a valve of this character, since there is great liability of particles of salt lodging in the working parts of a valve and preventing its perfect operation. As this valve forms no part of my present invention, it is unnecessary to further illustrate or describe the same.

To permit inspection of the operation of the vacuum pan —E— and the receiving chamber —K— I provide at intervals suitable glasses —L—, which may be of any desirable construction.

At Fig. 5 I have shown a somewhat modified form of lower section —e²— of a vacuum pan —E— and horizontal head —F—, which is particularly applicable when desired to construct my vacuum pan, so that the heads may be readily removable at will. In this construction I form a valve seat —f⁶— in the wall —f³— of the head —F— and form a corresponding valve seat —e⁸— in the adjacent wall of the section —e²—. Between these valve seats I interpose a valve —M— having conical extremities, whereby the valve automatically adjusts itself as the wall —f³— of the head is forced toward the adjacent wall of the section. To effect this lengthwise movement of the head I use a bolt —N— having its head bearing against a shoulder —f⁷— on the wall —f'— of the head —F— and its shank engaged with a nut —$n$— bearing against the adjacent wall of the vacuum pan section —$e^2$—. With this construction I prefer to removably secure the inlet pipe —$f^8$— to the wall —$f'$— and to extend the same beyond the wall of the vacuum pan section. I also prefer to use an automatic valve —O— for closing the opening —$e^9$— leading from the valve —$e^8$— through the wall of the section —$e^2$— into the outlet chamber —$E^2$— of said section. This valve is forced against its seat —$e^{10}$— by a suitable spring —$O'$— bearing against an adjustable plug —$O^2$—, and is automatically closed when the pressure within the head —F— is insufficient to force the valve outward against the action of the spring —$O'$—. Connected to the chamber —$E^2$— is a suitable outlet pipe —$E^3$—.

At Fig. 6 I have shown a further modified form of my invention in which I dispense with the outlet chamber —$E^2$— and connect a separate outlet pipe —P— to the outlet pipe —$f^2$— of each of the sections.

It will be readily apparent that, hot air, gases and steam or other heated circulating fluid may be passed through the heads —F— and heating tubes of my invention for effecting its operation.

The operation of my invention will be readily perceived from the foregoing description and upon reference to the drawings, and it will be particularly noted that the same is practical and effective in operation, and durable in use. It will also be evident that the detail construction and arrangement of the parts of my improved vacuum pan may be somewhat varied from the exact construction shown and described without departing from the spirit of my invention; hence I do not herein specifically limit myself to such exact construction and arrangement.

Having thus fully described my invention, what I claim as new, and desire to secure by Letters Patent, is—

1. The combination with a vacuum pan having doors in its upright wall for permitting access to the interior of the vacuum pan and a closed head removably supported within the pan and formed with inlet and outlet chambers arranged one above the other and with a partition interposed between said chamber; of a tube extending outwardly from the head having its outer end closed and its opposite end opening from the outlet chamber of the head, and a pipe extending outwardly from the inlet chamber of the head having its outer end discharging within said tube and its other end opening from said inlet chamber, substantially as described.

2. The combination with a vacuum pan having oppositely arranged openings, for the inlet and outlet of a heating agent a horizontal closed head formed separable from the vacuum pan and removably supported within said vacuum pan between said openings and formed with inlet and outlet chambers arranged one above the other and with a partition interposed between said chambers and tubes having their inner ends opening from the opposite ends of the heads and having their outer ends connected with said openings in the vacuum pan; of a tube extending upwardly above the head and having its upper end closed and its lower end opening from the outlet chamber of the head, and a pipe extending upwardly from the inlet chamber of the head and having its upper end open and arranged within said tube for discharging thereinto, and its opposite end opening from said inlet chamber, substantially as specified.

3. The combination with a vacuum pan having a normally closed outlet opening in its side wall, a horizontal head formed separable from the vacuum pan and removably supported within the vacuum pan and formed with inlet and outlet chambers; of a tube extending upwardly above the head and having its upper end closed and its lower end opening from the outlet chamber of the head, a pipe extending upwardly from the inlet chamber of the head and having its upper end open and arranged within said tube for discharging thereinto and its opposite end opening from said inlet chamber, a removable plug secured to the lower end of the pipe for securing the same in position, and a second removable plug in the wall of said head opposite to the former plug, substantially as described.

4. The combination with a vacuum pan having a normally closed outlet opening in its side wall; of a substantially horizontal closed head supported within the pan and formed with an upper and a lower chamber separated by an intervening substantially horizontal partition in the head, an upwardly extending tube opening from the upper chamber of said head having its lower end rigidly secured in the upper wall of the head and its upper end closed, said tube being of less length than the length of said opening in the wall of the vacuum pan and an upwardly extending pipe opening from the lower chamber of the head having one end supported by the partition and the other extending within the tube to a point in close proximity to its upper end, substantially as and for the purpose set forth.

5. The combination with a vacuum pan having a normally closed outlet opening in its side wall; of a substantially horizontal closed head formed separable from the vacuum pan and supported within the pan and provided with an upper and a lower chamber separated by an intervening substantially horizontal partition in the head, tubes having their ends opening from the opposite ends of the head and having their outer ends discharging through the wall of the pan, a series of upwardly extending tubes opening at intervals from the upper chamber of said head having their lower ends rigidly secured in the upper wall of the head and their upper ends closed, a series of removable plugs in the partition beneath said tubes, a series of upwardly extending pipes opening from the lower chamber of the head having their lower ends secured to said plugs and their upper ends extended within the tubes for discharging thereinto, and removable plugs in the lower wall of the head beneath the former plugs, substantially as described.

6. The combination with a vacuum pan having a normally closed opening in its side wall, a closed head formed separable from the vacuum pan and supported within said pan formed with inlet and outlet chambers and having its end walls adjacent to opposite portions of said side wall and a pair of pipes having their outer ends secured to and discharging through said portions of the wall of said vacuum pan and their inner ends secured to the end walls of said heads for discharging a heated fluid into the inlet chamber and withdrawing the same from the outlet chamber; of a tube extending outwardly from the head having its outer end closed and its opposite end opening from the outlet chamber of the head, and a pipe extending outwardly from the inlet chamber of the head having its outer end discharging within said tube and its other end opening from said inlet chamber, substantially as and for the purpose described.

7. The combination with a vacuum pan having a normally closed opening in its side wall, a series of heads removably secured within the pan, each being formed with inlet and outlet chambers and with an intervening partition, and having its end walls adjacent to opposite portions of said side wall, a series of inlet pipes of less diameter than the heads permanently fixed to the wall of the vacuum pan and to the adjacent end walls of the inlet chambers of the heads, and a series of outlet pipes of less diameter than the heads permanently fixed to the wall of the vacuum pan and to the adjacent walls of the outlet chambers of said heads; of a tube extending outwardly from the head, having its outer end closed and its opposite end opening from the outlet chamber of the head, and a pipe extending outwardly from the inlet chamber of the head having its outer end discharging within said tube and its other end opening from said inlet chamber, substantially as and for the purpose specified.

8. The combination with a vacuum pan formed with a normally closed opening in its side wall and with a substantially horizontal conduit in its side wall, a series of heads removably secured within the pan, each being formed with inlet and outlet chambers and with an intervening partition, and having its end walls adjacent to opposite portions of said side wall, a series of inlet pipes of less diameter than the heads permanently fixed to the wall of the vacuum pan and opening at intervals into said conduit and opening less diameter than the heads permanently fixed to the wall of the vacuum pan and to the adjacent walls of the outlet chambers of said heads; of a series of heating tubes extending outwardly from the heads and having their outer ends closed and their opposite ends connected with said heads, said tubes being of less length than the length of said opening in the side wall of the vacuum pan, substantially as and for the purpose set forth.

9. The combination with a vacuum pan, a series of heads formed separable from the vacuum pan and supported within said pan, each being formed with inlet and outlet chambers, a series of inlet pipes permanently fixed to the wall of the vacuum pan and to the adjacent end walls of the inlet chambers of the heads, a series of outlet pipes permanently fixed to the wall of the vacuum pan and to the adjacent walls of the outlet chambers of said heads, a conduit or chamber in the wall of the vacuum pan for discharging into said inlet pipes, an inlet pipe for said conduit or chamber, and a plug in the wall of the conduit for permitting access to the inlet pipes; of tubes extending outwardly from the heads having their outer ends closed and their opposite ends opening from the outlet chambers of the heads, and pipes extending outwardly from the inlet chambers of the heads having their outer ends discharging within said tubes and their other ends opening from said inlet chambers, substantially as described.

10. The combination with a vacuum pan, a series of heads formed separable from the vacuum pan and supported within said pan with their end walls separated from the adjacent walls of the vacuum pan each being formed with inlet and outlet chambers, a series of inlet pipes permanently fixed to the wall of the vacuum pan and to the adjacent end walls of the inlet chambers of the heads, a series of outlet pipes permanently fixed to the wall of the vacuum pan and to the adjacent end walls of the outlet chambers of said heads, a conduit or chamber in the upright wall of the vacuum pan for receiving the discharge from the outlet pipes, and an outlet pipe connected to said chamber; of tubes extending outwardly from the heads having their outer ends closed and their opposite ends opening from the outlet chambers of the heads, and pipes extending outwardly from the inlet chambers of the heads having their outer ends discharging within said tubes and their other ends opening from said inlet chambers, substantially as specified.

In testimony whereof I have hereunto signed my name, in the presence of two attesting witnesses, at Syracuse, in the county of Onondaga, in the State of New York, this 27th day of May, 1892.

JOHN H. DUNCAN.

Witnesses: